(12) United States Patent
Fujino

(10) Patent No.: US 7,853,990 B2
(45) Date of Patent: Dec. 14, 2010

(54) NETWORK CONNECTION SYSTEM, NETWORK CONNECTION METHOD, AND SWITCH USED THEREFOR

(75) Inventor: Shozo Fujino, Tokyo (JP)

(73) Assignee: NEC Corporation, Tokyo (JP)

( * ) Notice: Subject to any disclaimer, the term of this patent is extended or adjusted under 35 U.S.C. 154(b) by 1205 days.

(21) Appl. No.: 11/151,281

(22) Filed: Jun. 14, 2005

(65) Prior Publication Data

US 2006/0010484 A1    Jan. 12, 2006

(30) Foreign Application Priority Data

Jun. 15, 2004   (JP)   ............... 2004-176976

(51) Int. Cl.
  *H04L 29/06*   (2006.01)
  *G06F 15/16*   (2006.01)
(52) U.S. Cl. .......................... 726/3; 709/229
(58) Field of Classification Search ........................ None
  See application file for complete search history.

(56) References Cited

U.S. PATENT DOCUMENTS

2004/0066769 A1 *   4/2004   Ahmavaara et al. ......... 370/338
2004/0114553 A1 *   6/2004   Jiang et al. .................. 370/328

FOREIGN PATENT DOCUMENTS

JP    2002-152276    5/2002
JP    2003-318922    11/2003
WO    2004/034720 A2    4/2004

OTHER PUBLICATIONS

Japanese Office Action dated May 27, 2009 with partial English-language translation.

* cited by examiner

*Primary Examiner*—Brandon S Hoffman
(74) *Attorney, Agent, or Firm*—McGinn IP Law Group, PLLC

(57) ABSTRACT

A wireless LAN access point receives a destination URL from a mobile terminal and provides the destination URL to an authentication switch. The authentication switch is connected to an authentication gateway associated with the destination URL and provides the destination URL to the authentication gateway. The authentication gateway connected to the authentication switch causes an authentication server associated with the destination URL to perform authentication of the mobile terminal (1). After the authentication server authenticates the mobile terminal (1), the authentication server provides an IP address to the mobile terminal (1). The mobile terminal is thus connected to the content server specified by the URL.

9 Claims, 5 Drawing Sheets

| 31a URLs OF CONTENTS | 31b IP ADDRESSES OF AUTHENTICATION GW |
|---|---|
| pc1.sub2.org.ne.jp | 200.0.0.1 |
| pc3.sub1.org.ne.jp | 200.0.0.1 |
| www.wg1.soshiki.ne.jp | 60.0.0.3 |

31 MEMORY

NETWORK CONNECTION SYSTEM, NETWORK CONNECTION METHOD, AND SWITCH USED THEREFOR

BACKGROUND OF THE INVENTION

1. Field of the Invention

The present invention relates to a network connection system, and particularly to a network connection system in which a mobile terminal is connected through a wireless access point to a content server that requires authentication of the mobile terminal, and to a method implemented in the system.

2. Description of the Related Art

Services that provide hot spots are conventionally known. A hot spot connects terminal devices to the Internet through a wireless LAN access point to provide services to an indefinite number of users. In recent years, dual terminal devices are developed in which cellular terminal devices conforming to the Personal Digital Cellular (PDC) system and the 3rd Generation Partnership Project (3GPP) standards are equipped with wireless LAN interfaces (WLAN I/Fs), raising expectations that the use of hot spots will further spread.

A wireless Local Area Network (LAN) access point is connected to intranets of Internet Services Providers (ISPs) who are under contract with the hot spot provider. The hot spot provider may also serve as an ISP.

A user terminal device, e.g., a mobile terminal, is required to perform the following procedure to connect through a hot spot to a content server that requires authentication on the Internet. First, the user terminal device undergoes ISP authentication to connect to the Internet (specifically, an intranet of an ISP) through the hot spot. Next, the user terminal device specifies the Uniform Resource Locator (URL) of the authentication-requiring content server and is then subjected to authentication for the use of content by the authentication-requiring content server. Such techniques are described in JP 2003-318922 A and JP 2002-1522-76 A, for example.

When a user terminal device connects to an intranet of a hot spot provider (ISP) through the hot spot, the authentication server of the hot spot provider often authenticates the user terminal device (user) using a tunneling protocol such as L2TP.

FIG. 7 shows an example in which a mobile terminal 20 accesses an intranet 25 of a hot spot provider, who also serves as an ISP, through a hot spot 25. In other words, FIG. 7 is a diagram illustrating an example in which the mobile terminal 20 connects to the Internet through the hot spot 25.

In FIG. 7, the hot spot 25 has a wireless LAN access point 21 and is connectable to the Internet 27. The intranet 26 includes an authentication gateway 22 connectable to the Internet 27, a secure content server 23 requiring entry of credit numbers etc., and an authentication server 24.

The access from the mobile terminal 20 to the intranet 26 through the hot spot 25 will be described. The mobile terminal 20 accesses the authentication gateway 22 via the wireless LAN access point (W-LAN AP) 21 and the Internet 27. In this case, the mobile terminal 20 and the authentication gateway 22 serve as Virtual Private Network (VPN) terminations.

The authentication server 24 performs authentication of both tunnel ends according to a tunneling protocol such as L2TP. For example, the authentication server 24 authenticates the mobile terminal 20 by obtaining a user ID and a password from the mobile terminal 20 and referring to its own database. When the authentication server 24 has authenticated the mobile terminal 20, the authentication server 24 assigns an IP address to the mobile terminal 20. The authentication gateway 22 provides the mobile terminal 20 with the IP address assigned by the authentication server 24 and connects the mobile terminal 20 to the intranet 26. The mobile terminal 20, receiving its own IP address from the authentication server, recognizes that a permission has been granted to its connection to the desired content server.

Before the mobile terminal 20 connected to the intranet 26 accesses the content server 23 on the intranet 26, the mobile terminal 20 is authenticated by the content provider through a procedure such as Secure Socket Layer (SSL).

The charge for the hot spot service is a fixed amount (including free of charge) in most cases.

When a user terminal device (mobile terminal) attempts to connect to an authentication-requiring content server through a hot spot, the user first performs an ISP authentication procedure in the hot spot. In addition, the user specifies the URL of the authentication-requiring content server and undergoes authentication for the content server. This means that the user has to perform two different authentication procedures to access the content server through the hot spot. This deteriorates user convenience.

SUMMARY OF THE INVENTION

An exemplary aspect of the present invention provides a network connection system and a network connection method that are capable of reducing the number of authentication procedures required when a mobile terminal connects through a wireless LAN (hot spot) to a content server requiring authentication on the Internet.

According to an aspect of the present invention, a network connection system of the invention includes a plurality of intranets each containing a content server, an authentication server, and an authentication gateway. These intranets are connected to the Internet through the authentication gateways. The network connection system further includes a hot spot serving as an intranet that includes a wireless LAN access point to a mobile terminal and an authentication switch, the authentication switch being connected to the Internet.

From the wireless LAN access point, the mobile terminal supplies the hot spot with information (content server information) that specifies a content server to which the mobile terminal desires to connect. Then, the authentication switch of the hot spot transfers the information to an authentication gateway associated with the desired content server, and the authentication gateway requests the authentication server to perform authentication of the mobile terminal. When the authentication server authenticates the mobile terminal, the mobile terminal is permitted to connect to the content server.

According to the aspect, when the mobile terminal sends the content server information, an authentication gateway is selected according to the content server information, and the selected authentication gateway connects the mobile terminal to the authentication server corresponding to the content server information. After the authentication server authenticates the mobile terminal, the mobile terminal is provided with an IP address and permitted to connect to the content server.

Thus, the authentication by the authentication server associated with the content server also serves as ISP authentication, allowing reduction in the number of authentication procedures.

Thus, even when the mobile terminal sends content server information without being ISP-authenticated, the mobile terminal can connect to the content server.

In the above aspect, the authentication switch preferably includes a memory and a connection part. The memory stores, for each piece of content server information, information for making connections to an authentication gateway associated with each of a plurality of candidates for connection (content servers). When the wireless access point receives content server information, the connection part selects one of the candidates for connection stored in the memory in association with the content server information. The connection part connects the mobile terminal to the authentication gateway that is stored in the memory in association with the selected candidate.

Other embodiments of the invention will become more apparent from the following description of the preferred embodiments.

DETAILED DESCRIPTION OF THE PREFERRED EMBODIMENT

Preferred embodiments of the present invention will be described below referring to the accompanying drawings.

Figure 1:
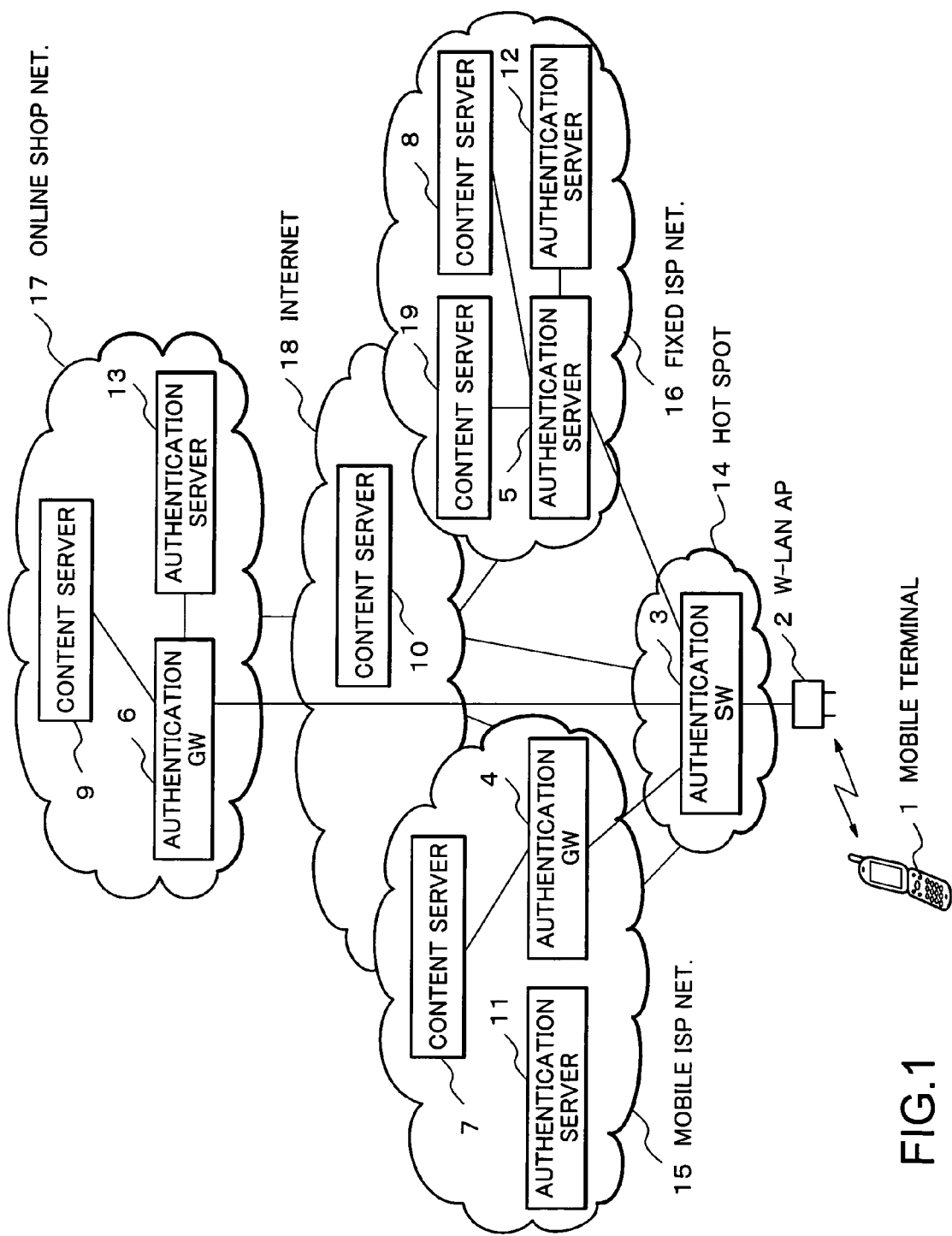
FIG. 1 is a diagram showing a network connection system according to an embodiment of the present invention.

FIG. 1 is a diagram showing a network connection system according to the embodiment of the present invention.

In FIG. 1, the network connection system includes a mobile terminal 1, a hot spot 14, a mobile ISP network 15, a fixed ISP network 16, an online shop network 17, and the Internet 18 connecting those networks. A content server 10 is connected to the Internet 18.

The hot spot 14 includes a wireless LAN access point (W-LAN AP) 2 communicating with the mobile terminal 1 and an authentication switch (SW) 3 connected to the wireless LAN access point 2. The hot spot 14 is connected to the Internet 18 through the authentication switch 3.

The mobile ISP network 15 includes an authentication gateway (GW) 4 connected to the Internet 18, an authentication server 11 connected to the authentication gateway 4, and a content server 7 connected to the authentication gateway 4.

The fixed ISP network 16 includes an authentication gateway (GW) 5 connected to the Internet 18, an authentication server 12 connected to the authentication gateway 5, and content servers 8 and 19 connected to the authentication gateway 5.

The online shop network (online ISP network) 17 includes an authentication gateway (GW) 6 connected to the Internet 18, an authentication server 13 connected to the authentication gateway 6, and a content server 9 connected to the authentication gateway 6.

A. Configuration of the Embodiment

The components of the configuration will be described in detail below.

A-1. Mobile Terminal 1

The mobile terminal 1 is a mobile phone, a personal digital assistant (PDA), or the like. For example, the mobile terminal 1 is a portable dual terminal that conforms to standards such as PDC or 3GPP and that has interfaces, (I/Fs) for both of internet-connectable cellular communications and WLAN communications. The mobile terminal 1 can also be a notebook personal computer (PC) or a PDA having a Wireless LAN (WLAN) I/F.

The mobile terminal 1 contains VPN (Virtual Private Network) client software installed therein, and the VPN client software contains a list of URLs of connectable content servers. The connectable content servers are servers that require authentication. For example, the URL list includes the URLs of the content servers 7, 8, 9, and 19.

The mobile terminal 1 transmits a destination URL, selected by a user from the URL list, to the wireless LAN access point 2 of the hot spot 14. Then, the mobile terminal 1 establishes a VPN session with the authentication switch 3 and the authentication GW 4, 5, or 6.

A-2. Wireless LAN Access Point (WLAN AP) 2 and Hot Spot 14

The hot spot 14 is run by a wireless LAN provider and conforms to standards such as 802.11a/b/g, and includes the wireless LAN access point 2. The wireless LAN access point 2 performs wireless communication with the mobile terminal 1 existing in the coverage of the hot spot 14. The wireless LAN access point 2 supplies the authentication switch 3 with the URL of the content server (namely, content server information) sent from the mobile terminal 1.

A-3. Authentication Switch 3

Figures 2, 3:
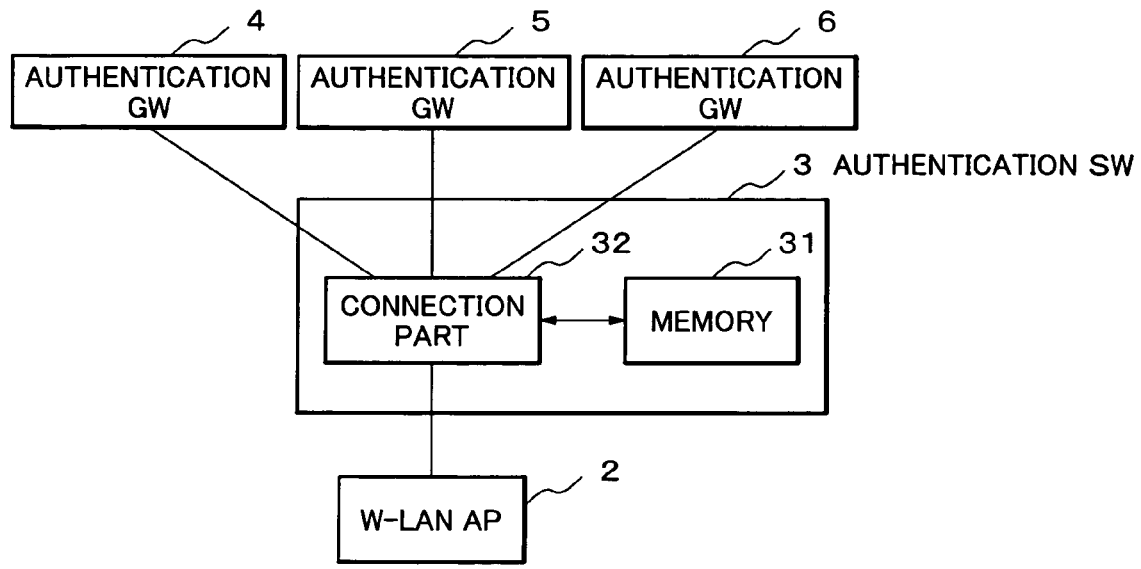
FIG. 2 is a block diagram showing an example of an authentication switch 3.
FIG. 3 is a diagram showing an example of information stored in a memory 31.

FIG. 2 is a block diagram showing an example of the authentication switch 3. In FIG. 2, the same components as those depicted in FIG. 1 are donated by the same reference numerals. In FIG. 2, the authentication switch 3 consists of a memory 31 and a connection part 32.

The memory 31 stores content servers' URLs as entries in correspondence with the IP addresses of the authentication gateways (GWs) associated with the content servers indicated by the URLs. In other words, the memory 31 stores the IP addresses of the authentication gateways that are directly connected to the respective content servers. The authentication gateways are also connected to the content servers and to the authentication servers. The URLs of the content servers stored in the memory 31 are a plurality of candidates to which the mobile terminal 1 may be connected.

FIG. 3 shows an example of the information stored in the memory 31.

As shown in FIG. 3, the memory 31 contains the content servers' URLs 31a as entries and the IP addresses 31b of the authentication GWs associated with the content servers indicated by the URLs. FIG. 3 shows that the URL of the content server 7 is "www.wg1.soshiki.ne.jp", the URL of the content server 8 is "pc1.sub2.org.ne.jp", and the URL of the content server 19 is "pc3.sub1.org.ne.jp". FIG. 3 also shows that the IP address of the authentication GW 5 associated with the content servers 8 and 19 is "200.0.0.1" and the IP address of the authentication GW 4 associated with the content server 7 is "60.0.0.3".

When the connection part 32 accepts a content server's URL from the wireless LAN access point 2, the connection part 32 searches the content servers' URLs 31a stored in the memory 31 to select a content server's URL that most closely matches the URL accepted from the wireless LAN access point 2. That is, the connection part 32 selects the URL of a content server that most likely corresponds to the accepted URL. The connection part 32 is then connected to the authentication GW having the IP address that is stored in the memory 31 in association with the selected URL. The connection part 32 transmits to the connected authentication GW the content server's URL received from the mobile terminal 1.

A-4. Authentication Gateways (GWs) 4, 5, and 6

The authentication GW 4 is a proxy for the authentication server 11 and the content server 7 and manages connections among the mobile terminal 1, the authentication server 11, and the content server 7. The authentication GW 4 is also a proxy for the mobile ISP network 15. The mobile ISP network 15 is an intranet that includes the authentication server 11 and the content server 7. The mobile ISP network 15 is connected with terminals authenticated by the authentication server 11.

The authentication GW 5 is a proxy for the authentication server 12 and the content servers 8 and 19 and manages connections among the mobile terminal 1, the authentication server 12, and the content servers 8 and 19. The authentication GW 5 is also a proxy for the fixed ISP network 16. The fixed ISP network 16 is an intranet that includes the authentication server 12 and the content servers 8 and 19. The fixed ISP network 16 is connected with terminals authenticated by the authentication server 12.

The authentication GW 6 is a proxy for the authentication server 13 and the content server 9 and manages connections among the mobile terminal 1, the authentication server 13, and the content server 9. The authentication GW 6 is also a proxy for the online shop network 17. The online shop network 17 is an intranet that includes the authentication server 13 and the content server 9. The online shop network 17 is connected only with terminals authenticated by the authentication server 13.

When connected with the authentication switch 3, the authentication GW 4, 5, or 6 receives a URL from the mobile terminal 1 and assigns to the mobile terminal 1 an authentication gateway ID (Auth GW ID) and a Session ID for identifying the user. The Auth GW ID is an identifier of the destination authentication GW. The Session ID is an identifier of the user (mobile terminal 1) who uses the authentication GW. The session ID is unique in the authentication GW.

The authentication GWs 4, 5, and 6 operate also as gateways (GWs) for user data flow. The authentication gateways may be provided with packet counters for "Auth GW ID+Session ID session identifiers" to allow the mobile ISP network 15, the fixed ISP network 16, etc. to make charges according to the amounts of packets.

A-5. Mobile ISP Network 15, Authentication Server 11, and Content Server 7

The mobile ISP network 15 is an intranet that includes a group of servers. A carrier (a company that provides communications services) providing mobile phone services has constructed to provide Internet connections and original content services.

The authentication server 11 is associated with the content server 7 and authenticates clients (e.g., the mobile terminal i) that attempt to connect to the content server 7. The authentication server 11 may authenticate not only mobile terminals that attempt to connect to the content server but also clients (e.g., mobile terminals) that attempt to connect to other facilities of the mobile ISP network 15. The content server 7 provides contents to clients (mobile terminal 1) authenticated by the authentication server 11.

A-6. Fixed ISP network 16, Authentication Server 12, and content servers 8 and 19

The fixed ISP network 16 is an intranet that includes a group of servers. A provider providing Internet connection services has constructed the intranet to supply original content services. The authentication server 12 is associated with the content servers 8 and 19. The authentication server 12 authenticates clients (e.g., the mobile terminal 1) that attempt to connect to the content server 8 or 19. The authentication server 12 is capable of authenticating not only clients that attempt to connect to the content server 8 or 19 but also clients that attempt to connect to other facilities in the fixed ISP network 16. The content servers 8 and 19 provide content only to clients (the mobile terminal 1) authenticated by the authentication server 12.

A-7. Online Shop Network 17, Authentication Server 13, and Content Server 9

The online shop network 17 is an intranet that includes a group of servers. A provider providing online download services of software files, such as music, video, games, etc., has constructed the intranet to provide its original content services.

The authentication server 13 is associated with the content server 9 and authenticates clients (e.g., the mobile terminal 1) that attempt to connect to the content server 9. The authentication server 13 may authenticate not only clients that attempt to connect to the content server 9 but also clients that attempt to connect to other facilities of the online shop network 17. The content server 9 provides contents to clients (the mobile terminal 1) authenticated by the authentication server 13.

A-8. Internet 18 and Content Server 10

The content server 10 is provided on the Internet 18.

B. Operation of the Embodiment

First, the outlines of operation will be described.

A mobile communication user (a user of the contents of the mobile ISP network 15, a user of an outdoor network with a data communication card, etc.) uses the mobile terminal 1 to make access through the hot spot 14 to a particular intranet, or a communication network or a server for provider-original contents (which requires authentication by an authentication server) The mobile communication user enters, into the mobile terminal 1, a URL of a content server of a particular intranet or a URL of a content server managing provider-original content.

The mobile terminal 1 sends the user-selected content server URL to the wireless LAN access point 2 with a radio signal. The wireless LAN access point 2 provides the URL received from the mobile terminal 1 to the authentication switch 3.

The authentication switch 3 searches the content servers' URLs 31a stored in the memory 31 to select a URL of a content server that most closely matches the URL accepted from the wireless LAN access point 2; The authentication switch is connected with the authentication GW that is specified by the IP address stored in the memory 31 in association with the selected URL. The authentication switch 3 provides the connected authentication GW with the content server's URL provided from the mobile terminal 1.

The authentication GW connected with the authentication switch 3 causes the authentication server corresponding to the content server's URL provided by the authentication switch 3 to perform authentication of the mobile terminal 1. After the authentication server authenticates the mobile terminal 1, the authentication gateway provides the mobile terminal 1 with an IP address of that mobile terminal. Thus, the mobile terminal 1 recognizes that a connection to the content server specified by the URL has been permitted. Then, the mobile terminal is capable of accessing the contents in the content server.

In this embodiment, the authentication by the authentication server associated with the content server also serves as ISP authentication, and thus a reduced number of authentication procedures are required in connecting the mobile terminal 1 to an authentication-requiring content server through the wireless LAN.

Also, the wireless LAN provider is capable of quickly delivering, in the hot spot, local service information etc. to mobile terminals without authentication, or of quickly performing urgent communication to mobile terminals in a hot spot in emergency facilities. Further, from a maintenance point of view, it is possible to quickly notify mobile terminals of a failure of communication equipment, such as the wireless LAN access point. While conventional techniques are capable of providing such services only to already ISP-authenticated mobile terminals, the embodiment is free from such restrictions.

Next, the authentication operation in this embodiment will be described in further detail.

B-1. Authentication for Direct Access to an ISP

Control data and user data that the mobile terminal 1 transmits to and receives from the wireless LAN access point 2 are provided with a VPN header by the operation of the VPN client software.

Figure 4:
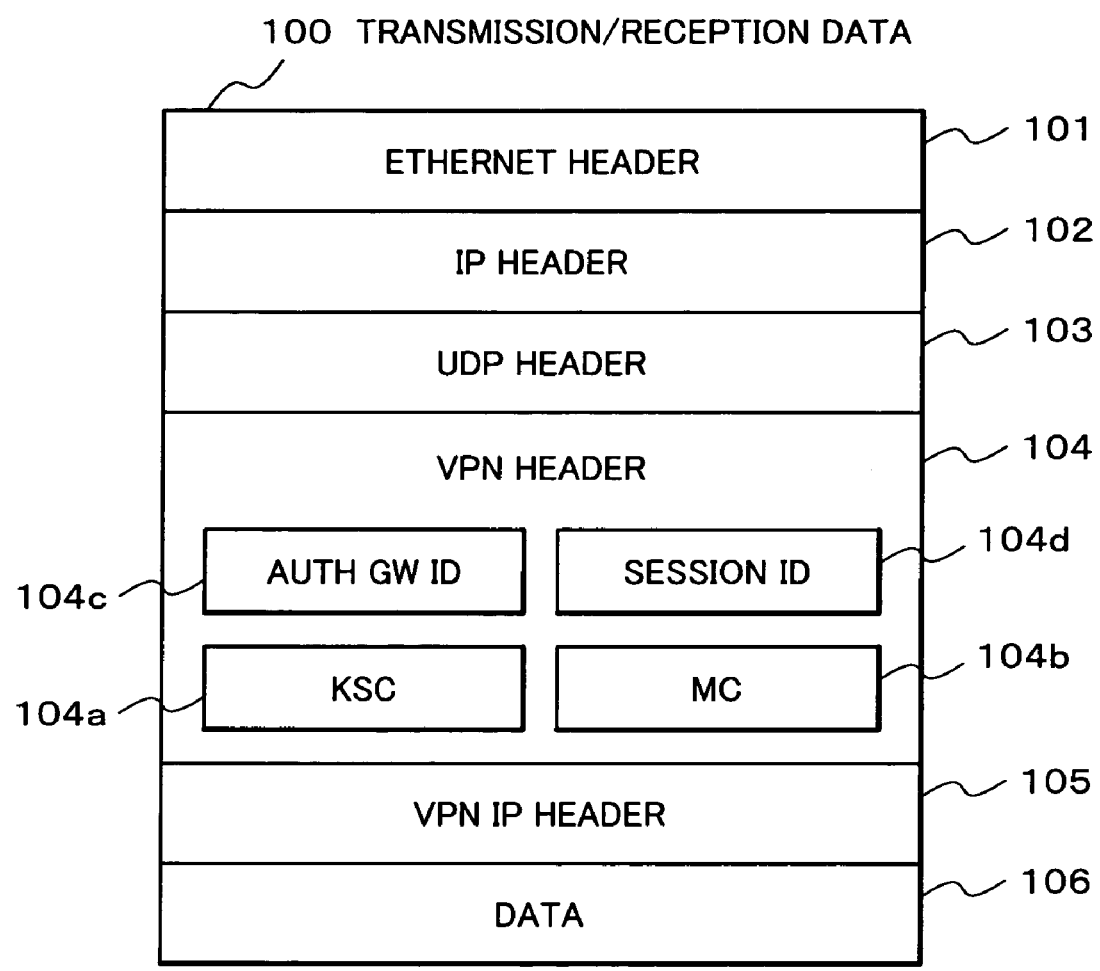
FIG. 4 is a diagram showing an example of data transmitted/received by a mobile terminal 1.

FIG. 4 is a diagram showing an example of control data and user data (hereinafter the control data and user data may be referred to collectively as "transmission/reception data") In FIG. 4, transmission/reception data 100 includes an Ethernet header 101, an Internet IP header 102, a UDP header 103, a VPN header 104, a VPN IP header 105, and Data 106.

The VPN header 104 includes a KSC 104a, an MC 104b, an Auth GW ID 104c, and a Session ID 104d. The KSC 104a is a sequence number and is incremented for each packet. The KSC 104a is for preventing replay packets by unauthorized accessing users. The MC 104b is a checksum (Check Summation) for preventing packets from being falsified. When the transmission/reception data 100 is control data, the data 106 contains destination URL information.

Figure 5:
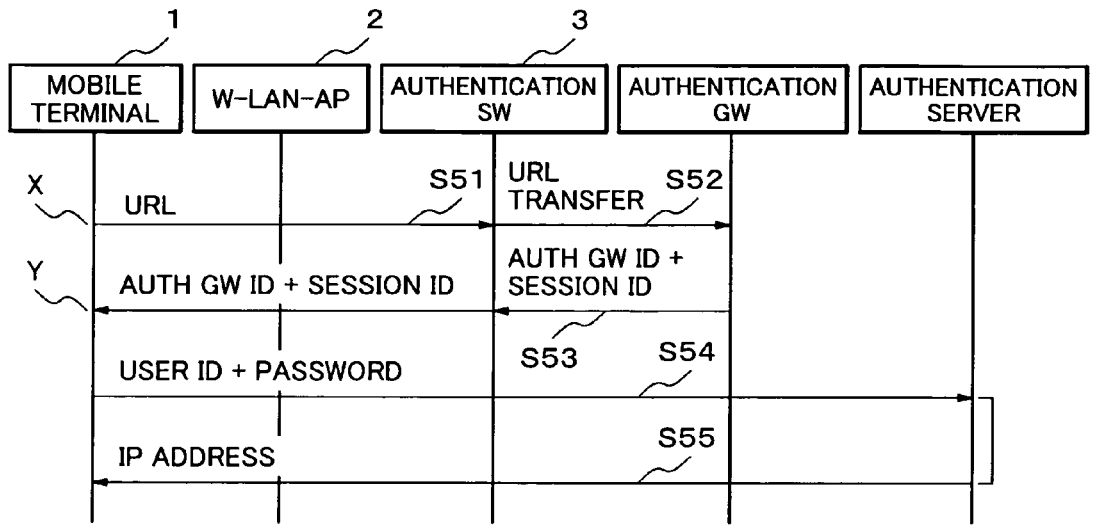
FIG. 5 is a sequence chart illustrating an operation of the network connection system.

FIG. 5 is a sequence chart illustrating the operation of the system. The operation of the system will now be described referring to FIG. 5. It is assumed that, before the steps of FIG. 5 is started, the mobile terminal 1 has established a connection with the authentication SW 3 through the wireless access point 2 without an authentication procedure in the hot spot. It is also assumed that the mobile terminal 1 has acquired the Media Access Control (MAC) address of the authentication switch 3 before the steps of FIG. 5.

The user of the mobile terminal 1 selects a destination URL from a URL list in the VPN client software provided in the mobile terminal 1. The information (URL) is stored in a cache of the mobile terminal 1. Each time the mobile terminal 1 accesses the same URL, the mobile terminal 1 is automatically connected to the same authentication GW. The mobile terminal 1 may be capable of changing a connection target when instructed by the user.

When the mobile terminal 1 selects a destination URL in step 51, an authentication starting packet carrying the selected destination URL is transmitted to the wireless LAN access point 2. The wireless LAN access point 2 provides the authentication starting packet to the authentication switch 3.

On the basis of the authentication starting packet, the authentication switch 3 and the authentication GW 4, 5, or 6 mediate the authentication procedure between the mobile terminal 1 and the authentication server 11, 12, or 13.

More specifically, in step S52, the connection part 32 of the authentication switch 3 applies a "longest match" search to the content servers' URLs stored in the memory 31 from the least significant position of the server address in the destination URL carried on the authentication starting packet. Thus, the connection part 32 selects a URL that provides a longest match with the URL carried on the authentication starting packet, from among the content servers' URLs stored in the memory 31. The connection part 32 reads from the memory 31 the IP address of the authentication gateway stored in association with the selected URL.

Next, the authentication switch 3 is connected to the authentication GW assigned the read IP address and transfers the authentication starting packet, including the URL, to the connected authentication GW.

In step S53, the authentication GW connected to the authentication switch 3 assigns Auth GW ID and Session ID to the mobile terminal 1. The assigned Auth GW ID and Session ID are provided to the mobile terminal 1 through the authentication switch 3 and the wireless LAN access point 2.

Subsequently, the mobile terminal 1 transmits a user ID and a password to the authentication server through the wireless LAN access point 2, the authentication SW 3, and the authentication GW. An authentication procedure thus starts. For example, in step S54, the mobile terminal 1 transmits a user ID and a password to the authentication server.

In step S55, the authentication server authenticates the mobile terminal 1 (user) by referring to its own database and finds an IP address of the authenticated mobile terminal 1.

The authentication GW connected with the authentication switch 3 provides the mobile terminal 1 with the IP address assigned to the mobile terminal 1. The provision of the IP address allows the mobile terminal 1 to recognize that a connection to the desired content server has been permitted.

The authentication procedure performed between the mobile terminal 1 and the authentication server is not limited to that shown in steps S54 and S55, but may be changed appropriately. For example, the authentication procedure shown in steps S56 to S61 of FIG. 6 may also be used.

Figure 6:
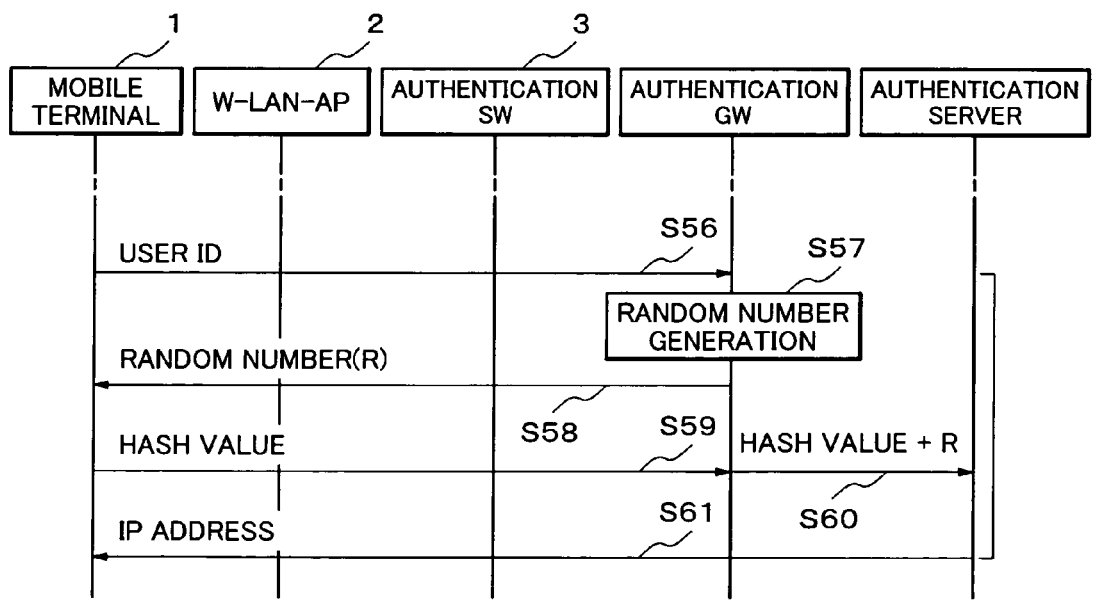
FIG. 6 is a diagram illustrating an authentication procedure that is different from an authentication procedure shown in FIG. 5.
Figure 7:
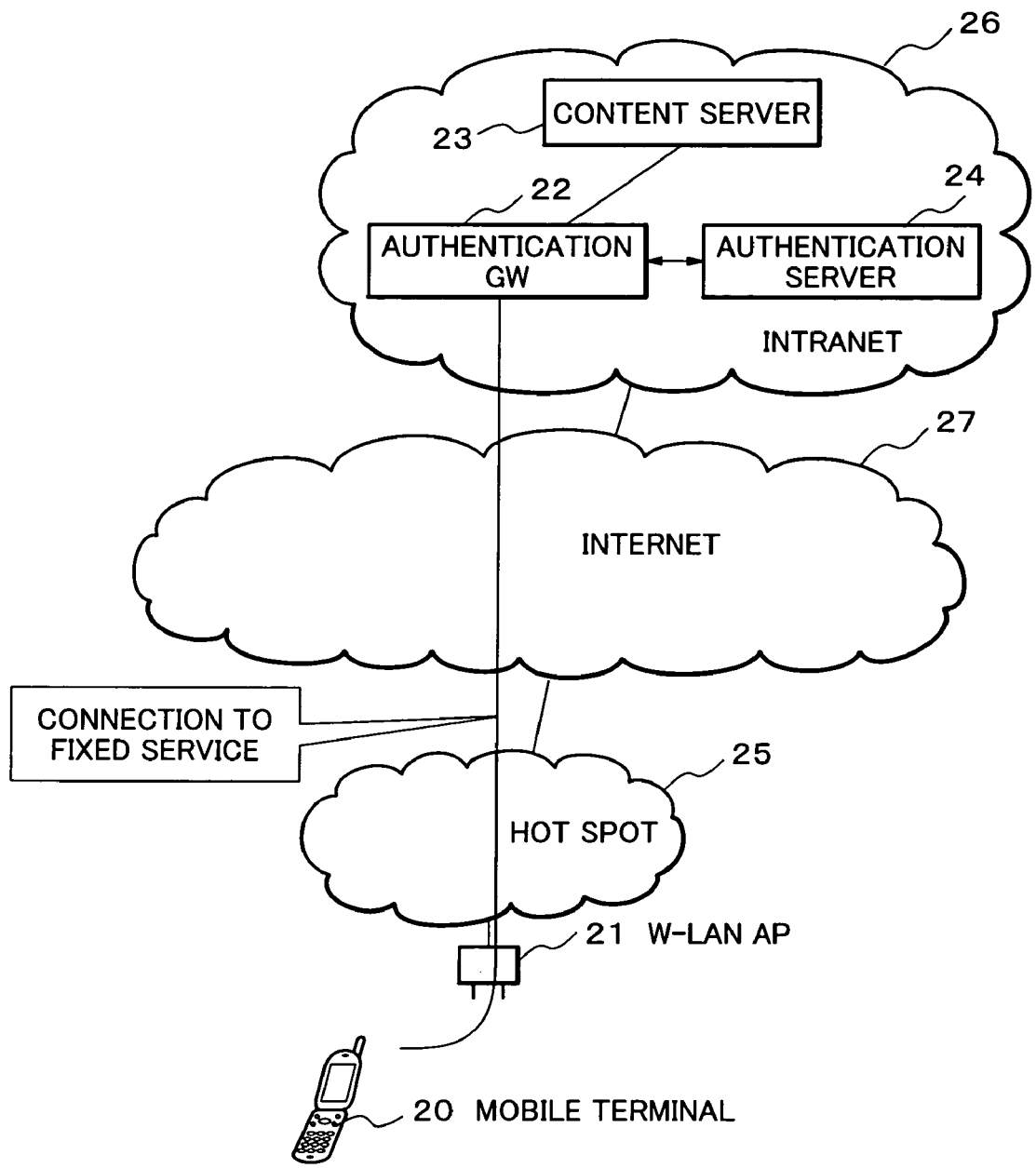
FIG. 7 is a diagram showing a conventional network connection system.

Next, the authentication procedure shown in steps S58 to S61 of FIG. 6 will be described. These steps are executed following step S53 of FIG. 5. When the mobile terminal 1 receives "Auth GW ID and Session ID" in step S53 (Y in FIG. 5), the mobile terminal 1 transmits a user ID in step S56 to the authentication GW through the wireless LAN access point 2 and the authentication SW 3. The authentication GW generates a random number in step S57, and transmits the random number to the mobile terminal 1 in step S58.

In step S59, the mobile terminal 1 calculates a hash value on the basis of the random number accepted from the authentication GW and the user ID and password, and transmits the hash value to the authentication GW. In step S60, the authentication GW transmits to the authentication server the hash value sent from the mobile terminal 1 and the random number generated in step S57.

In step S61, the authentication server performs authentication of the mobile terminal 1 (user) by referring to the hash value sent from the mobile terminal 1, the random number sent from the authentication GW, and its own database. After the mobile terminal 1 is authenticated, the authentication server assigns an IP address to the mobile terminal 1. The authentication GW provides the mobile terminal 1 with the assigned IP address through the authentication SW. The mobile terminal 1 (the user of the mobile terminal 1) is thus authenticated by the authentication server and permitted to connect to the content server specified by the destination URL.

For example, when the mobile terminal 1 sets "http://pc3.sub1.org.ne.jp/index.html" (the URL of the content server 19) as the destination URL, the authentication switch 3 performs a longest match search and is connected with the authentication GW 5 having the IP address "200.0.0.1". The authentication server 12 performs authentication of the mobile terminal 1 through the authentication GW 5.

When the mobile terminal 1 sets "pc1.sub2.org.ne.jp" as the destination URL, the authentication switch 3 is connected with the authentication GW 5 having the IP address "200.0.0.1".

While the example above shows an operation in which the authentication switch 3 uses the authentication GW 5 when the group name in the destination URL is "org", the memory 31 in the authentication switch 3 may be set to use different authentication GWs for different sub-addresses like "sub1" and "sub2".

The sequence of FIG. 5 shows that no special authentication procedure is necessary when the mobile terminal 1 connects with the authentication switch 3. Using this feature, the wireless LAN provider is capable of delivering, from the authentication switch 3 to the mobile terminal 1, service information (local service information) such as discount information about a shop in the hot spot area 14 and about the content in the network of the hot spot 14. For example, the authentication switch 3 is capable of delivering local service information to the mobile terminal 1 in the stages shown as "X" and "Y" in FIG. 5.

(1) Stage X

In the stage X, the mobile terminal 1 knows the MAC address of the authentication switch 3 and therefore the mobile terminal 1 and the authentication switch 3 are capable of performing communication. Accordingly, the authentication switch 3 is capable of delivering local service information to all mobile terminals 1 provided with VPN clients existing in the coverage of the hot spot 14.

(2) Stage Y of FIG. 5

In the stage Y, the mobile terminal 1 is assigned the Auth GW ID and Session ID and therefore the authentication SW 3 is capable of delivering information only to a particular mobile terminal 1 by specifying the Session ID.

In addition to local service information, the authentication switch 3 is also capable of quickly providing urgent information to the mobile terminal 1 in a hot spot in emergency facilities, and of quickly notifying the mobile terminal 1 of a failure of communication equipment.

When the mobile terminal 1 transmits user data, the authentication switch 3 routes the user data to the destination authentication GW indicated by the header of the user data on the basis of the combination of Auth GW ID+Session ID of the header.

The Auth GW ID and Session ID are encapsulated by the VPN header shown in FIG. 4 between the mobile terminal 1 and the authentication GW, but are decapsulated in other sections.

B-1-1. When the User of the Mobile Terminal 1 is a Mobile ISP User

When the user has a contract with the mobile ISP that manages the mobile ISP network 15, the user can use the contracted mobile ISP through the hot spot 14 by setting in the mobile terminal 1 the URL of the content server 7 in the mobile ISP network 15 as the destination URL.

The authentication GW 4 in the mobile ISP network 15 allows the user (mobile terminal 1) authenticated by the authentication server 11 to connect to the content server 7 original to the mobile ISP network 15 and makes a fixed content charge based on the service.

For example, the content server 7 cooperates with the mobile phone services and provides large-capacity contents deliverable in the hot spot 14. For example, the contents of the content server 7 can be large-capacity mobile phone applications, location services, etc.

When the authentication GW 4 has an internal packet counter, a charge may be made based on the amount of use of the provider-original content server 7 for each user.

The mobile terminal 1 is also capable of accessing the content 10 on the Internet 18 through the authentication GW 4. As to the use of the content server 10, whether the authentication GW 4 makes a charge by amount depends on the policy of the mobile ISP.

B-1-2. When the User of the Mobile Terminal 1 is a Fixed ISP User

Description will be made of the case where the user has a contract with the fixed ISP that manages the fixed ISP network 16. The user can use the contracted fixed ISP while using the hot spot 14 by setting in the mobile terminal 1 the URL of the content server 8 or 19 in the fixed ISP network 16 as the destination URL.

The authentication GW 5 in the fixed ISP network 16 allows the user (mobile terminal 1) authenticated by the authentication server 12 to connect to the content server 8 or 19 original to the fixed ISP network 16 and the authentication GW 5 makes a fixed content charge based on the provided service. For example, even when the mobile terminal 1 exists in the coverage of an outdoor hot spot 14, the content servers 8 and 19 provide the user of the mobile terminal 1 with a service plan, communication rate service, IP phone service, etc. that the user has already contracted for home use. When the authentication GW 5 has an internal packet counter, a charge can be made based on the amount of use of the provider-original content servers 8 and 19 for each user.

The mobile terminal 1 is also capable of accessing the content server 10 on the Internet 18 through the authentication GW 5. As to the use of the content server 10, whether the authentication GW 5 makes a charge based on the amount depends on the policy of the fixed ISP.

B-2. Authentication for Direct Access to an Online Shop

Description will be made of an example case where a user who has no contract with any ISPs desires to connect the mobile terminal 1 to the content server 9 in the online shop network 17. The user can connect the mobile terminal 1 to the online shop network 17 by setting in the mobile terminal 1 the URL of the content server 9 in the online shop network 17 as the destination URL.

In this case, the authentication switch 3 is connected with the authentication GW 6 using a layer-2 path over the Internet 18. In this case, the authentication procedure at the online shop etc. is directly performed by the authentication server 13 in the first place, while the authentication procedure has conventionally been performed after a connection with the Internet 18 has been established.

The authentication GW 6 in the online shop network 17 allows the user (mobile terminal 1) authenticated by the authentication server 13 to connect to the content server 9 original to the online shop network 15 and makes a fixed content charge. For example, the content server 9 provides software files (contents) such as music, video, games, etc.

When the authentication GW 6 has an internal packet counter, a charge can be made based on the amount of use of the content server 9 for each user. In this case, when the authentication GW 6 sets the software prices based on the amounts of downloaded data, it is possible to flexibly deal with orders from individual users and to automatically calculate file prices. For example, the file prices are automatically set so that video software of longer recording times and larger volumes are priced higher.

C. Description of Effects of the Embodiment

In this embodiment, the authentication switch 3 applies a longest match search to the server addresses stored in the memory 31 from the least significant position of the URL specified by a user, thereby automatically determining a destination authentication GW that is associated with the URL. Therefore, the user can be directly authenticated for content just by specifying the target service (destination URL) without any other cares.

The wireless LAN provider is capable of quickly delivering to users in the hot spot, without authentication, service information (local service information) such as discount information about a shop in the hot spot area or about the content in the hot spot network. The wireless LAN provider is also capable of delivering information only to a particular user by specifying Session ID.

The wireless LAN provider is further capable of quickly performing urgent communication to the mobile terminal 1 in a hot spot in emergency facilities. From a maintenance point of view, the wireless LAN provider is capable of quickly notifying the mobile terminal 1 in the hot spot, e.g., of a failure of communication equipment, such as the overload of the internet.

Also, while conventional systems require separate authentication procedures for the connection to the Internet and for the use of content, the system of this embodiment merely requires a single authentication procedure performed by a provider who gives authentication for the use of content (e.g., the mobile ISP, the fixed ISP, or the online shop).

Furthermore, conventionally, the connection to the Internet through a hot spot required ISP authentication by the provider who runs the hot spot. However, in this embodiment, a user can be authenticated and charged in the hot spot for an ISP with which the user has a contract for home use.

Also, according to this embodiment, since all user packets are received via the authentication GWs, it is easy to make a charge based on the amount of packets. Also, it is possible to use, after authentication, provider-original content that is unconnectable through the Internet, or to provide a large-volume data download service original to the hot spot. In this case, when the software prices are set based on the amounts of downloaded data, it is possible to automatically calculate the file prices.

This embodiment described above may be modified as follows.

The destination URL entered into the mobile terminal 1 may be replaced by a character string, such as a provider name, and the memory 31 of the authentication SW may store the correspondence between the character string and the IP address of the authentication GW. In this case, the authentication SW does not perform the longest match search.

When the mobile terminal 1 is connected through a wireless LAN hot spot of a carrier to an IMS (IP Multimedia Subsystem) network which is carrier's third-generation service, the network configuration is intactly applicable to the network configuration of this embodiment. Therefore, the authentication GWs of this embodiment may be introduced to the WAG (Wireless LAN (WLAN) Access Gateway) in the 3GPP-WLAN configuration diagram according to 3GPP TS23.234 shown in FIG. 6.

Although the invention has been described in relation to particular embodiments, it is not thereby limited but on the contrary is susceptible to modifications and variations which will become apparent to one skilled in the art.

What is claimed is:

1. A network connection system, comprising:
   a plurality of intranets each including a content server, an authentication server and an authentication gateway connected to said content server and said authentication server, said authentication server authenticating a mobile terminal and permitting the mobile terminal to connect the content server; and
   a hot spot connecting said mobile terminal and each of said plurality of said intranets and including a wireless LAN access point which receives, from said mobile terminal, destination content server information and authentication information, wherein the destination content server information comprises a URL of the content server;
   wherein said hot spot further includes:
      an authentication switch that makes a connection with an authentication gateway associated with the content server identified by the destination content server information transferred via said wireless LAN access points, and that transmits said authentication information to an authentication gateway identified by the URL included in the destination content server information.

2. A network connection system according to claim 1, wherein the authentication switch comprises:
   a memory that stores connection information for making connections with said authentication gateways of the content servers in association with the destination content server information; and
   a connection part that selects a piece of said connection information on the basis of the destination server information, and that connects said mobile terminal and the authentication gateway corresponding to the selected connection information.

3. A network connection system according to claim 2, wherein the destination content server information comprises a character string corresponding to the content server.

4. A network connection system according to claim 1, wherein the authentication gateway comprises a wireless LAN access gateway.

5. A network connection method used for a network connection system,
   said system comprising:
      a plurality of intranets each including a content server, an authentication server and an authentication gateway connected to said content server; and
      a hot spot for connecting a mobile terminal and each of said plurality of said intranets and for including a wireless LAN access point and an authentication switch;
   said network connection method comprising:
      a receiving step in which said wireless LAN access point receives destination content server information and authentication information from said mobile terminal, wherein the destination content server information comprises a URL of the content server;
      an authentication gateway connection step in which said authentication switch transmits the authentication information to the authentication gateway identified by the URL included in said destination content server information and transferred by said wireless LAN access point; and after the authentication server authenticates the mobile terminal, the authentication gateway connecting the associated authentication server and the mobile terminal, and the mobile terminal being provided with an IP address to allow the mobile terminal to connect to the content server.

6. A network connection method according to claim 5, wherein the authentication switch comprises a memory that stores plural pieces of destination content server information and a plurality of connection information of authentication gateways that are associated with the content servers specified by the destination content server information, and wherein said authentication gateway connection step selects, in said memory, the connection information on the basis of the destination content server information and connects said mobile terminal to the authentication gateway identified by the selected connection information.

7. A network connection method according to claim 6, wherein the destination content server information comprises a character string corresponding to the content server.

8. An authentication switch that is used in a hot spot included in a network connection system, said system comprising:

a plurality of intranets each including a content server, an authentication server and an authentication gateway connected to the content server and the authentication server;

said hot spot for connecting a mobile terminal and each of said plurality of said intranets and for including a wireless LAN access point and said authentication switch;

said authentication switch comprising:

a memory that stores connection information for making connections with authentication gateways associated with the content servers in association with content server information; and a connection part that, when the wireless access point receives destination content server information including a URL of the content server, selects, on the basis of the URL included in the destination server information and transferred via the wireless access point, the connection information stored in the memory and connects the mobile terminal to the authentication gateway indicated by the selected connection information.

9. An authentication switch according to claim 8, wherein the destination content server information comprises a character string corresponding to the content server.

\* \* \* \* \*